INVENTOR.
JAN A. RAJCHMAN
BY Morris Rabkin
ATTORNEY

INVENTOR.
JAN A. RAJCHMAN
BY Morris A. Rabkin
ATTORNEY

INVENTOR.
JAN A. RAJCHMAN
BY Morris A. Rabkin
ATTORNEY

INVENTOR.
JAN A. RAJCHMAN
BY Morris Rabkin
ATTORNEY

INVENTOR.
JAN A. RAJCHMAN
BY [signature]
ATTORNEY

INVENTOR.
JAN A. RAJCHMAN
BY Morris L. Rabkin
ATTORNEY.

INVENTOR.
JAN A. RAJCHMAN
BY Morris B. Rabkin
ATTORNEY.

Jan. 16, 1962 J. A. RAJCHMAN 3,017,614

MAGNETIC STORAGE DEVICE

Original Filed Sept. 13, 1954 12 Sheets-Sheet 8

INVENTOR.
JAN A. RAJCHMAN
BY Morris A. Rabkin
ATTORNEY.

INVENTOR.
JAN A. RAJCHMAN
BY Morris A. Rabkin
ATTORNEY.

INVENTOR.
JAN A. RAJCHMAN
BY Morris A. Rabkin
ATTORNEY.

INVENTOR.
JAN A. RAJCHMAN
BY Morris L. Rabin
ATTORNEY.

INVENTOR.
JAN A. RAJCHMAN
BY Morris A. Rabkin
ATTORNEY.

3,017,614
Patented Jan. 16, 1962

3,017,614
MAGNETIC STORAGE DEVICE

Jan A. Rajchman, Princeton, N.J., assignor to Radio Corporation of America, a corporation of Delaware Original application Sept. 13, 1954, Ser. No. 455,724. Divided and this application Nov. 30, 1956, Ser. No. 625,332
13 Claims. (Cl. 340—174)

This invention relates to information storage, and more particularly to an improved magnetic device for information storage.

This application is a division of my copending application entitled "Magnetic Storage Device," Serial No. 455,724, filed September 13, 1954, and assigned to the assignee of the present invention.

Random access memories using arrays of magnetic cores have been described in a number of articles. In an article by Jan A. Rajchman appearing in the October 1953 issue of the "Proceedings of the I.R.E." entitled, "A Myriabit Magnetic-Core Matrix Memory," there is described a coincident-current, random access memory for storing information in a planar array of 10,000 magnetic cores. The cores are molded from a ferro-magnetic, ceramic-like material which is characterized by a substantially rectangular hysteresis loop.

A copending patent application by Jan. A. Rajchman, Serial No. 275,621, filed March 3, 1952, entitled "Magnetic Information Handling System," now Patent No. 2,691,154, describes and illustrates a system for storing information in what may be referred to as magnetic core planes. These core planes consist of a number of two-dimensional arrays of magnetic cores which are arranged in parallel with one another. The cores are then wired so that the information in binary form may be stored in the arrays. Storage may occur a "word" at a time, a word consisting of a number of binary digits, and all the digits of a word being stored or read out simultaneously. Each digit of a word is stored in a different one of the arrays, and the cores in which are stored each digit of a word occupy similar positions within their respective arrays.

The powder-like, ferro-spinel material is molded into the form of toroids or cores. Every core of the memory array must meet a standard of uniformity to a desired degree. Fabrication control of the cores to the degree required is not practical, even though the average yield of satisfactory cores may be relatively high. Therefore, it is necessary to test each individual core before it is wired into the array.

In order to minimize the current and power driving requirements and the physical size of the memory, the size of the cores is selected to be as small as can be conveniently handled.

It is apparent that the labor of the individual handling of the cores in the (1) molding, (2) firing, (3) testing, and (4) wiring processes is extremely tedious and time-consuming; and results in increasing the per core cost of a magnetic memory by a sizable factor. Thus, the use of individual cores, even when automatic machines are employed, limits the practical size, or capacity, of the magnetic memory.

In present day information handling and computing systems where large masses of information are required to be processed, it is customary to effect a compromise by combining a small capacity, fast access memory, such as an electrostatic storage tube, or relatively small magnetic core memory, with a larger capacity slower access memory such as a magnetic drum or magnetic tape. Such a compromise arrangment is not desirable because: (1) it is complicated from the point of view of the auxiliary equipment which is required for matching the operating characteristics of the two entirely different types of memories, and (2) the person programming the operation has to expend considerable effort in arranging the flow of information, in order that the most frequently used information may be available at the correct time in the high-speed portion of the memory system.

Therefore, it is an object of the present invention to provide an improved magnetic storage device.

Another object of the present invention is to provide an improved magnetic memory which retains the advantages of magnetic toroids as discrete storage elements but at the same time eliminates the difficulties of handling individual cores.

Still another object of the present invention is to provide an improved, high-speed random access memory which is relatively easy to construct and can be fabricated from inexpensive materials.

Yet another object of the present invention is to provide a large capacity, fast access magnetic memory capable of storing more information than was heretofore practical.

The above and further objects of the present invention are carried out by utilizing plates of magnetic material characterized by a substantially rectangular hysteresis loop. Briefly, in the exemplary embodiments of the present invention, an array of apertures is fabricated in each plate. Information in the form of a binary digit or "bit" may be stored in the magnetic material limiting a particular aperture of the plate by passing an excitation current through a selected aperture. Thus, in accordance with the present invention, a binary "one" or a binary "zero" may be represented by the direction of remanent magnetization of the magnetic material surrounding a particular aperture just as an information "bit" is represented in the direction of remanent magnetization of a core in the prior magnetic core memories. By applying a suitable excitation to the material limiting an aperture, the stored information may be read-out of the memory array. Cross-coupling, that is, interaction or cross-talk between circuits including the material of adjacent apertures is substantially eliminated by proper geometrical proportioning of the apertures and shaping of the plates.

The proper proportioning and spacing of the apertures in the plates, in accordance with a feature of the present invention, permits the practical use of the magnetic material bounding each aperture as a magnetic memory core.

In accordance with another important feature of the present invention, there is provided an improved means for fabricating a magnetic storage device by forming one or more of the digit windings on the apertured plate from a conductive coating which is applied directly to the plate, including the inside surface of the apertures. The plurality of plates may be stacked in a sandwich-like fashion to provide the large capacity desired.

The novel features and advantages of this invention, as well as the invention itself, will be more fully apparent from the following detailed description when read in connection with the accompanying drawing, in which:

FIGURE 1*a* is a plan view of an apertured plate.

FIGURE 1*b* is a cross-sectional view of the plate of FIGURE 1*a* taken through the line **1*b*—1*b***.

FIGURES 2*a* and 2*b* are typical hysteresis loops relating to the magnetic material which is employed in the present invention.

FIGURE 3 is a graph which shows the relationship of remanent magnetic induction and excitation currents for a thin ring of magnetic material.

FIGURES 4*a*, 4*b*, and 4*c* are curves which show the radial distribution of various parameters for a fixed excitation current.

FIGURES 5*a* and 5*b* are curves which illustrate the hysteresis loop rectangularity as a function of current excitations for various radii of magnetic material which limits an aperture.

FIGURE 6*a* illustrates a portion of a magnetic plate including four equidistantly spaced apertures of equal diameters.

FIGURE 6*b* is a curve illustrating the effect of the aperture size on various parameters.

FIGURE 7*a* is a plan view of a portion of an apertured plate wherein each aperture is provided with a single collar (or rim).

FIGURE 7*b* is a cross-sectional view of the plate of FIGURE 7*a* along the line 7*b*—7*b*.

FIGURE 7*c* is a cross-sectional view of a double collared apertured plate.

FIGURE 7*d* is a plan view of an apertured plate wherein alternate apertures are auxiliary apertures.

Figures 10A, 10B:
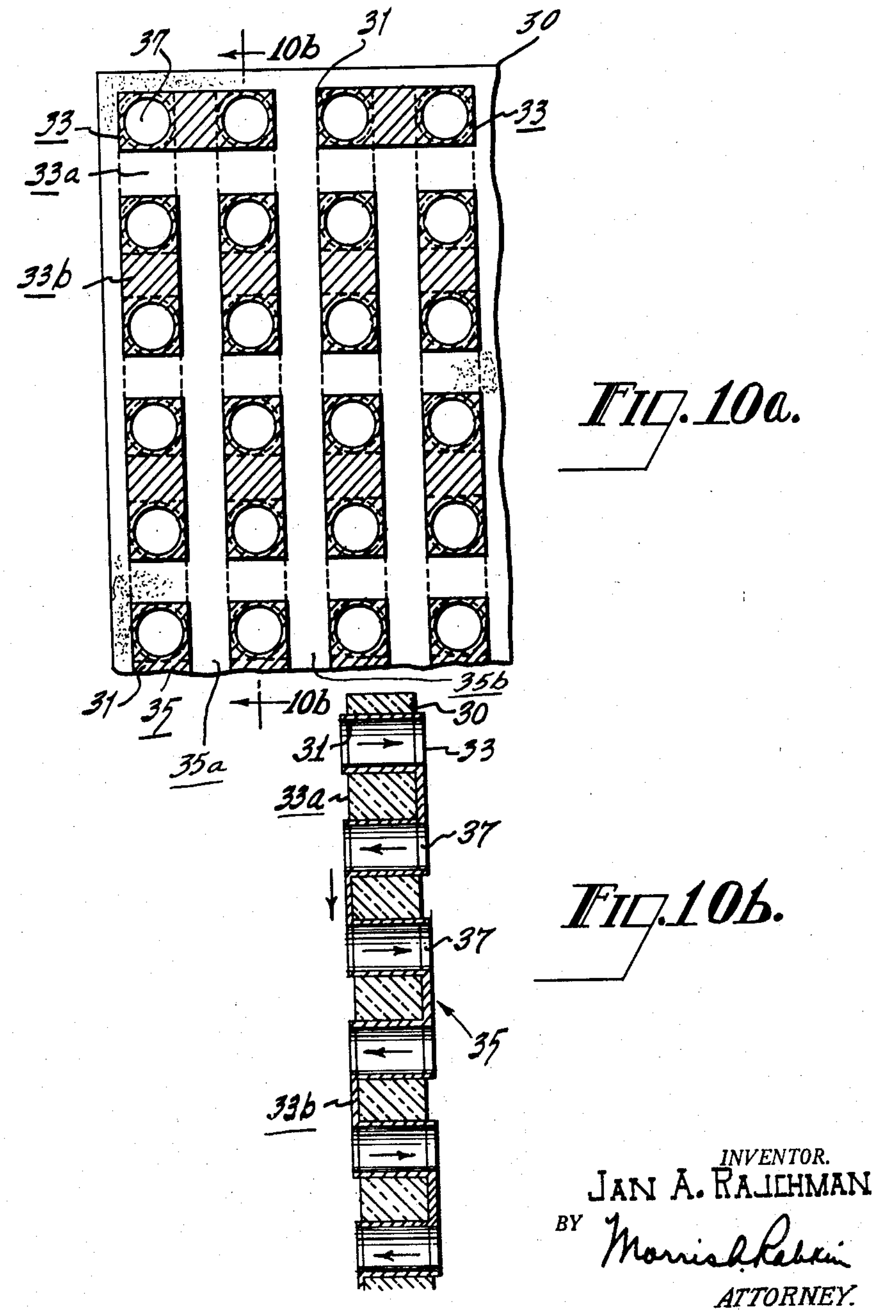

FIGURE 10*a* is a plan view of a portion of an apertured magnetic plate which illustrates one method of forming the digit plane winding.

FIGURE 10*b* is a side view of the portion of plate shown in FIGURE 10*a*.

Figure 11:
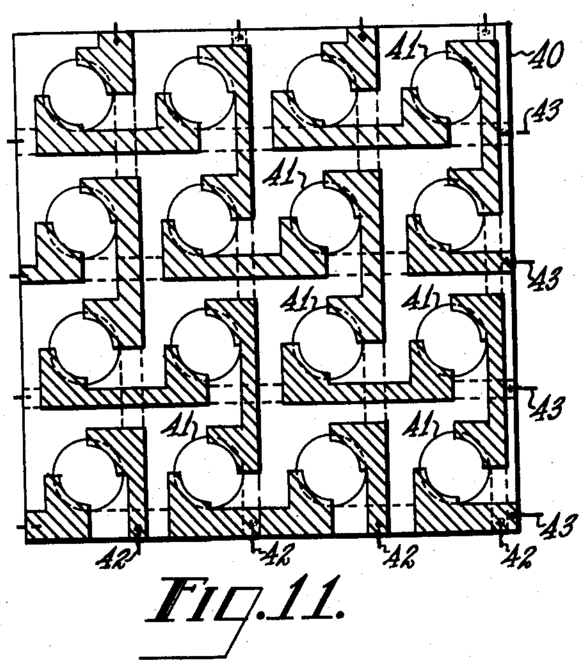

FIGURE 11 is a plan view of an apertured magnetic plate having the portions of the row and column windings on the plate constituted by separate conductive coatings.

Figure 12:
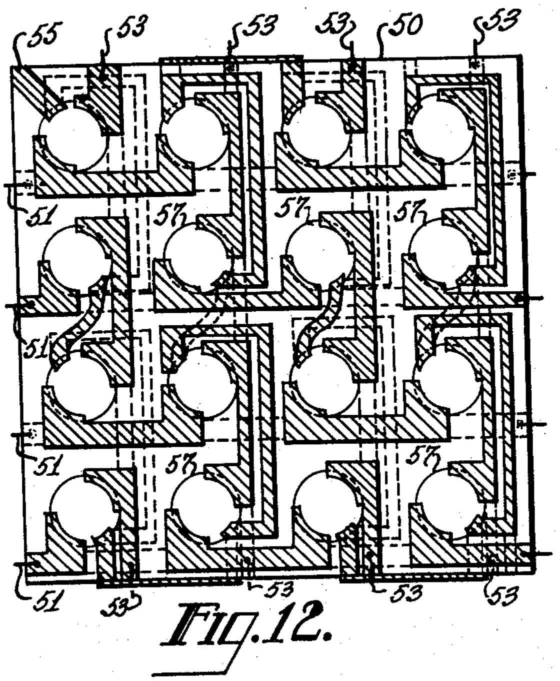

FIGURE 12 is a plan view of an apertured magnetic plate having the portion of the row, column, and readout windings on the plate constituted by separate conductive coatings.

Figure 13A:
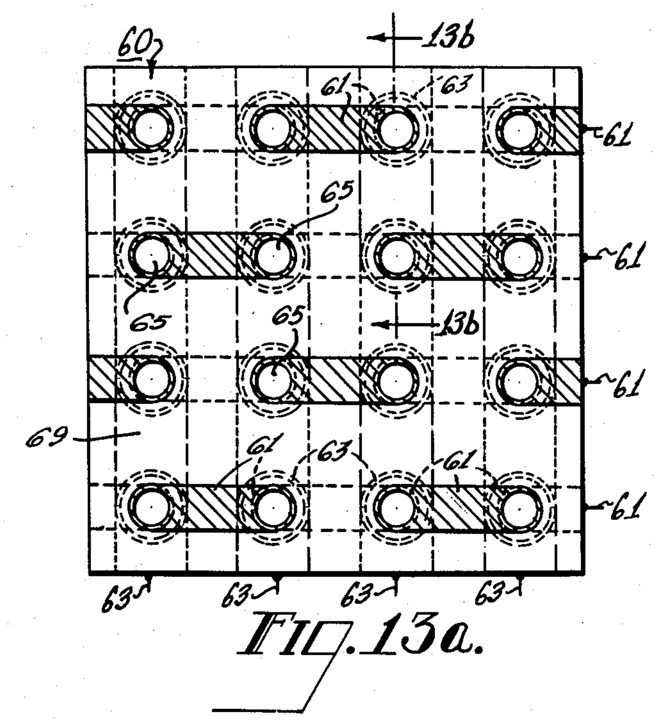

FIGURE 13*a* is a plan view of an apertured plate which illustrates a different method of forming multiple conductive windings on an apertured plate.

Figure 13B:
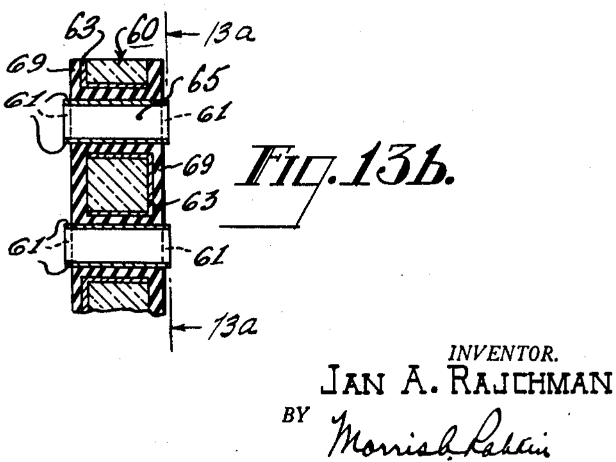

FIGURE 13*b* is a cross-sectional view of one of the apertures of FIGURE 13*a*.

Figure 14A:
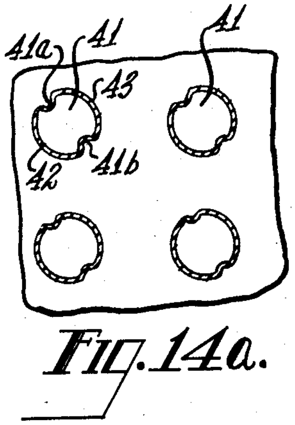
Figure 14B:
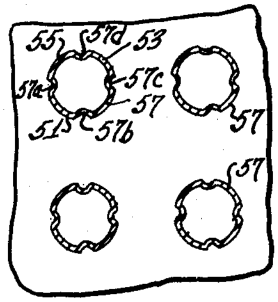
Figure 14C:
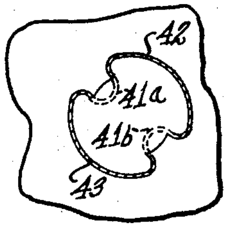
Figure 15:
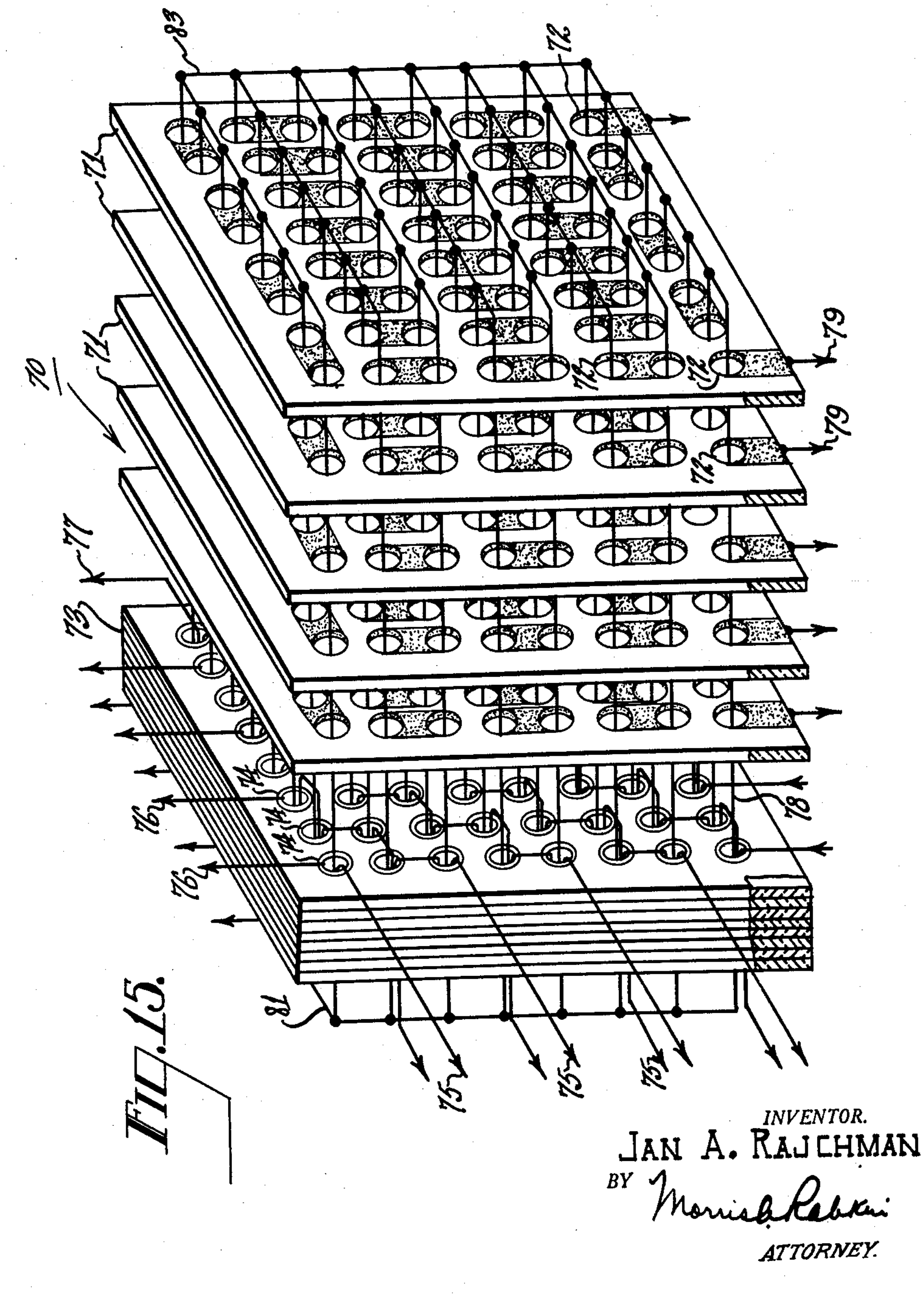

FIGURES 14*a*, 14*b*, 14*c* are plan views of a segment of an apertured plate which illustrate one method by which various conductive coatings are separated in the apertures, and FIGURE 15 is a perspective view of a magnetic memory system which is one embodiment of the present invention.

The materials with which the present invention is concerned are those characterized by a substantially rectangular hysteresis loop and, preferably, a low coercive force. Certain ferro-magnetic, ceramic materials, such as manganese-magnesium ferrite have been found to exhibit the desired properties. Metallic materials possessing the requisite "rectangularity" after the apertured plate is fabricated therefrom may also be employed.

Figure 1A:
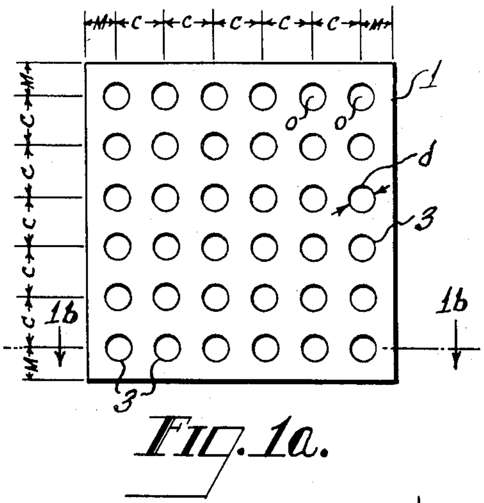

Referring to FIGURE 1*a*, there is illstrated an apertured plate 1 of magnetic material. Typically, the magnetic plate 1 is molded from a substantially homogeneous ferromagnetic, ceramic material. A plurality of apertures 3 are molded in the plate 1. The apertured plate 1 may then be annealed at a suitably high temperature to obtain the desired magnetic characteristics. Illustratively, the apertures 3 are arranged in a geometrical pattern corresponding to horizontal rows and vertical columns. The spacing between the centers "0" of two adjacent apertures 3 of a horizontal row is equal to a distance C; the spacing between the centers "0" of two adjacent apertures 3 of a vertical column is also equal to the distance C. The spacing of each horizontal row and each vertical column from the edges of the plate 1 is equal to a distance M. The diameter of each of the apertures 3 is equal to a value *d*.

Figure 1B:
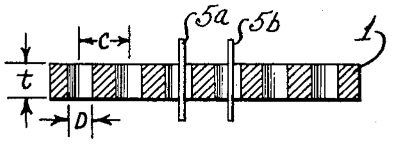

FIGURE 1*b* shows the cross-sectional view of a horizontal row of apertures taken along the line 1*b*—1*b* of FIGURE 1*a*. The plate 1 is shown in FIGURE 1*b* to be of a thickness "*t*." A portion of a conductor 5*a* is shown passing through one of the apertures 3 and a portion of a different conductor 5*b* is shown passing through an adjacent aperture.

Assume, now, that a current excitation is applied to the conductor 5*a* of FIGURE 1*b*. The magnetic material limiting the aperture threaded by the conductor 5*a* becomes magnetized as is the case with an isolated magnetic core. The lines of magnetic induction (B) can be considered to be circular near the periphery of the aperture threaded by the conductor 5*a*. However, as the radial distance increases, the lines of magnetic induction are distorted by the presence of the adjacent apertures.

The line integral of the magnetic field H is equal to the ampere-turns (*ni*) of excitation current passing through the area linked by the integral, where the area includes the aperture 3 which is threaded by the conductor 5*a*. The above relationship may be expressed by Equation 1 below:

$$\oint H ds = ni \quad (1)$$

where H is the magnetic field vector and *ds* represents an elemental length of the closed line.

If the lines of the magnetizing field are considered to be circular, then the magnetic field H varies inversely with the radial distance R from the conductor 5*a*, and Equation 1 becomes:

$$2\pi RH = ni \quad (2)$$

Consequently, there is a radius $R=R_1$ from the center of an aperture beyond which the magnetizing field $H_1$, for a particular excitation current value $i_1$, is smaller than the value corresponding to the "knee" of the hysteresis loop which describes the magnetic properties of the material in the B-H plane. Thus, if it is assumed that the magnetic material possesses a perfectly rectangular hysteresis loop, the excitation current does not produce any permanent effect on or change of the magnetic induction B at radial distances greater than $R_1$.

Hence, in theory, if the distance C between the centers 0 of the apertures 3 (FIGURES 1*a*) is made greater than the distance $2R_1$, there is substantially no interaction between the fluxes around any two adjacent apertures such as those threaded by conductors 5*a* and 5*b* of FIGURE 1*b* provided that the excitation current is of value $i_1$.

Another way of considering the ideal case of a perfectly "rectangular" material is to consider that there is an imaginary toroid of radius approximately equal to $R_1$ which surrounds each aperture, and that the magnetic flux is concentrated in the individual imaginary toroids without outside leakage. As a practical matter, however, the magnetic material does not exhibit an ideal rectangular hysteresis loop. In theory, when an "ideally thin" toroid (one of negligible radial dimension) is subjected to symmetrical positive and negative magnetizing forces, the toroid is characterized by a minor symmetrical hysteresis loop deviating from a perfect rectangle. In practice, various values of excitation currents or magnetizing forces produce different hysteresis loops.

The pressure of "rectangularity" of an actual toroid is conveniently described by its response to a schedule of interrogating current pulses. The hysteresis loops are then constructed by integrating the voltage wave shapes produced by the schedule of interrogating current pulses. By way of example, one measurement procedure which may be employed is described in detail in the aforementioned article entitled "A Myriabit Magnetic Core Matrix Memory," by Jan. A. Rajchman.

Figure 2A:
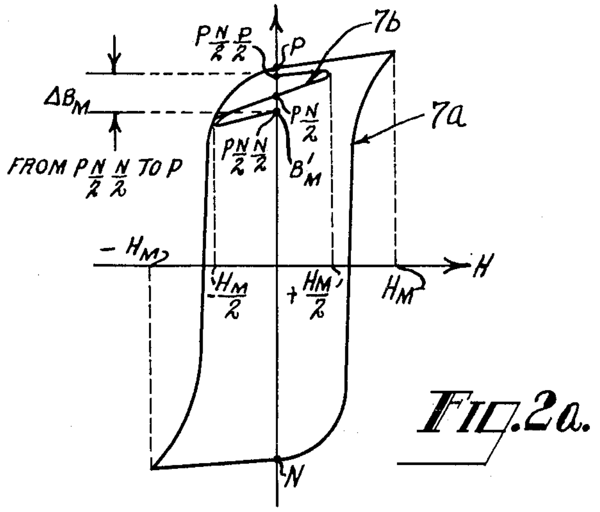
Figure 2B:
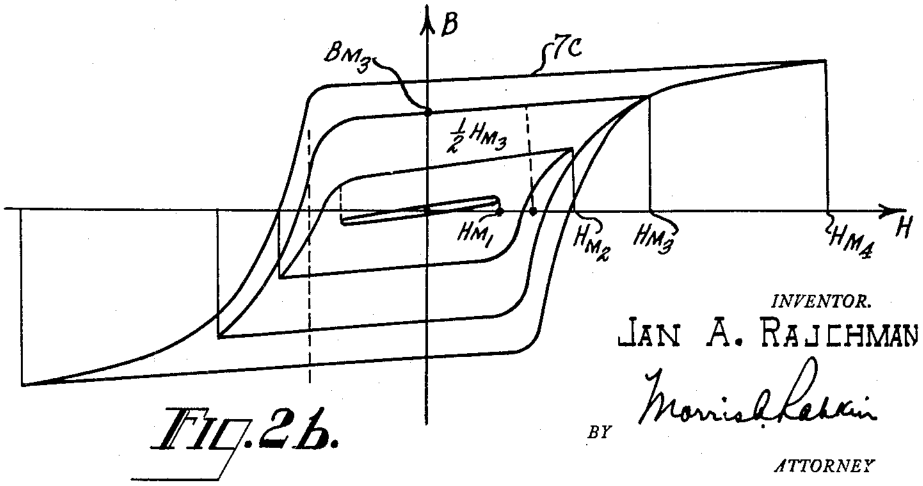

FIGURE 2*a* illustrates a typical minor, unsymmetrical hysteresis loop 7*a* and a typical unsymmetrical hysteresis loop 7*b* near remanence "P" for a magnetic core which is subjected to the schedule of pulses shown. For various values of magnetizing force H, different hysteresis loops are obtained and the minor hysteresis loops approach an asymptotic loop termed the major loop. FIG. 2*b* illustrates a family of these hysteresis loops including the major loop 7*c* for a typical core of the rectangular hysteresis loop magnetic material.

In the coincident-current magnetic memories, the response near remanence of a particular core to a current pulse of an intensity equal to approximately one-half the intensity required to produce the full magnetizing force is an important consideration. The ratio D between the response resulting from the full magnetizing force and the response resulting from one-half the magnetizing force is a measure of the discrimination of a core, that is, a measure of the disparity in the response between an excitation pulse of given amplitude and one of half the given amplitude.

The optimum relation between the minor symmetric loop and the asymmetric loops near remanence is obtained for a particular value of current, generally known as the switching current. For currents larger or smaller than the switching currents, the ratio of desired-to-undesired response becomes smaller. For most good "rectangular" materials, that is, materials having a hysteresis loop substantially rectangular, the response corresponding to the minor symmetrical loop is relatively high compared to the response corresponding to the asymmetric half-excited loops for a range of current excitations. Therefore, deviations from the switching current in the order of approximately 25% can be tolerated.

Figure 3:
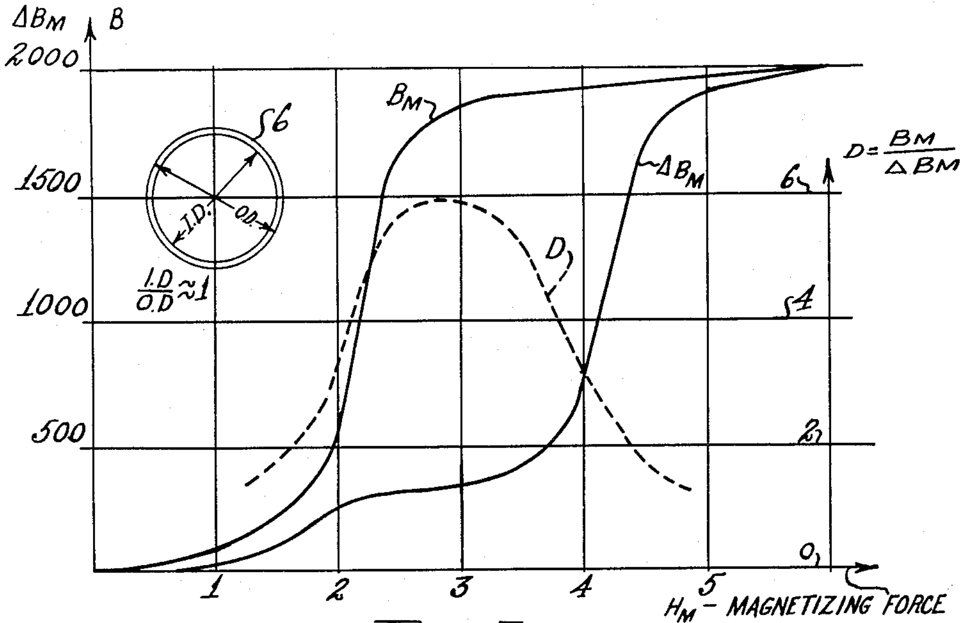

Referring to FIG. 3, there is shown an experimentally determined graph (somewhat idealized) of the parameters B*m*, ΔB*m*, and D (defined hereinafter) for a thin ring of the substantially rectangular hysteresis loop magnetic material such as the ring 6 shown in the upper left hand portion of FIGURE 3. The ratio between the outside diameter (O.D.) and the inside diameter (I.D.) differs from unity by as small an amount as could be conveniently constructed in the laboratory. The values of magnetizing force H which are plotted along the abscissa of the graph are measured at the inside surface of the ring 6 and are expressed in arbitrary units. B*m* is the remanent magnetic induction. The curve of B*m* in FIGURE 3 shows the variation of B*m*, the remanent induction, with the magnetization force H, for a family of symmetrical hysteresis loops such as those shown in FIGURE 2*b*. In making this plot, a value of H*m* is selected, the curve is found for which the selected H*m* is the maximum magnetizing force, and the remanent value B*m* read from the intersection of the curve thus found with the B axis. Compare, for example, $Hm_3$ and $Bm_3$ on FIGURE 2*b* which provide a point for a curve like that of FIGURE 3.

The ordinates of the curve of ΔB*m* of FIGURE 3 represent the decrease in value of remanent magnetic induction from the value B*m* resulting from demagnetizing forces applied to the ring 6 after application of the full magnetizing force. The abscissa of the curve of FIG. 3 represents the excitation magnetizing force which is required to traverse the symmetrical hysteresis loop producing the remanent induction B*m*.

In making the plot of ΔB*m* a value of H*m* is selected, and the corresponding value of B*m* is found for the selected value of H*m*. Then a value of magnetizing force equal to —½H*m* is selected, and the curve of the asymmetric half excited loop near remanence for which the value of —½H*m* is the maximum magnetizing force is found. This demagnetizing force of —½H*m* is applied twice so that two minor unsymmetrical loops are traversed in succession. The resulting remanent value of B*m'* is read from the intersection of the second asymmetric loop with the B axis. The value of B*m* is obtained by subtracting the value of B*m'* from the value of ΔB*m* previously found, i.e., *ΔBm—Bm'*. An example of —½H*m* and ΔB*m* which provide a point for a curve similar to that of FIGURE 3 is shown in FIGURE 2*a*. The demagnetizing force —½H*m* is applied only twice, because in modern materials having nearly rectangular hysteresis loops, the remanent magnetic induction approaches a limit with repeated application of such demagnetizing forces. This limit is adequately approximated by the remanent magnetic induction reached after only two applications of such demagnetizing force.

For any given core sample, "thin" or "thick," a measure of "rectangularity" can be defined by the number D, mentioned above, called the discrimination. This number is obtained as follows: The core is subjected to symmetrical excitations H*m* and —H*m*. The difference $\phi$ between the corresponding remanent fluxes is observed. For one of the remanent states, following the excitation +H*m*, for example, a demagnetizing force of —½H*m* is applied. This demagnetizing force causes the traversal of a minor unsymmetrical loop and establishes a new remanent condition after the termination of the demagnetizing force. A second demagnetizing force of —½H*m* is now applied. The corresponding remanent flux is observed. The different $\Delta\phi$ between the remanent flux following the H*m* magnetizing force, and the remanent flux following the two—½H*m* demagnetizing forces is measured. The discrimination is now obtained as $D=\phi/\Delta\phi$. The discrimination D is, therefore, a measure of the excellence of response of a given core sample, for a given amplitude of excitation, with respect to discriminating a complete reversal of remanence from the change in remanence, called "noise," induced by half the given amplitude of excitation. There is an optimum value of excitation current in this respect substantially at the maximum value of D. This maximum value of D for different samples may be taken as a measure of the nearness of the hysteresis loop to a truly rectangular hysteresis loop. The greater the maximum value of D, the more nearly the hysteresis loop of a sample is "rectangular."

In the ideally thin ring 6 of FIGURE 3, the flux is proportional to the magnetic induction since, by hypothesis, there is no radial variation of magnetic induction. Therefore, the discrimination is equal to $D=Bm/\Delta Bm$. The discrimination D is plotted against the magnetizing force H*m* in FIGURE 3. Consider, now, a radially thicker hypothetical ring, which conforms more closely to reality, where the ratio of the outside diameter to the inside diameter, O.D./I.D., is substantially greater than unity. In this radially thicker ring or core, each radial zone of the core describes its own minor symmetrical and asymmetrical loops because the magnetizing force is inversely proportional to the radius of a particular zone for any given excitation current. Thus, the net or observed hysteresis loop for the radially thicker toroid is not as "rectangular" as the observed hysteresis loop for the thin ring because the choice of excitation current amplitude, whatever it may be, cannot be optimum for all radial zones.

Figure 4A:
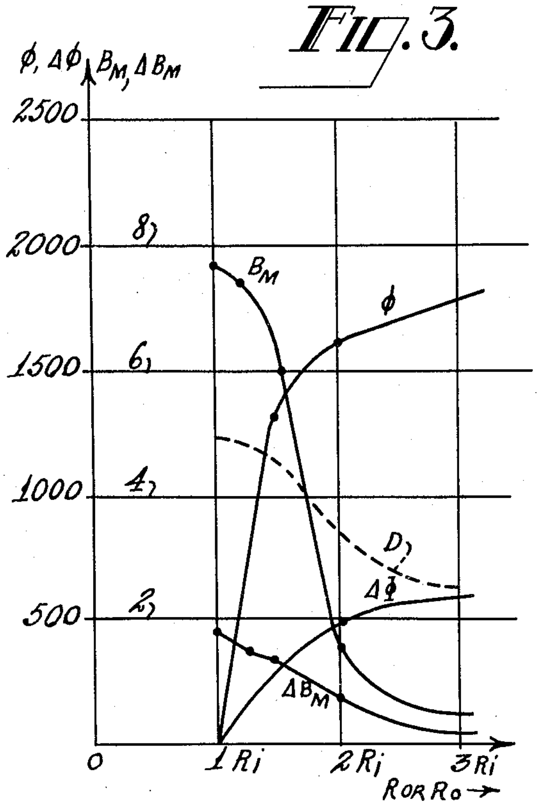
Figure 4B:
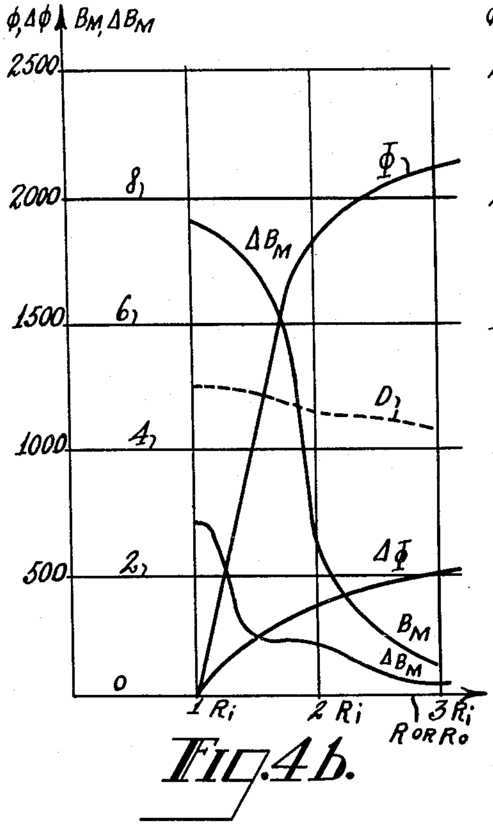
Figure 4C:
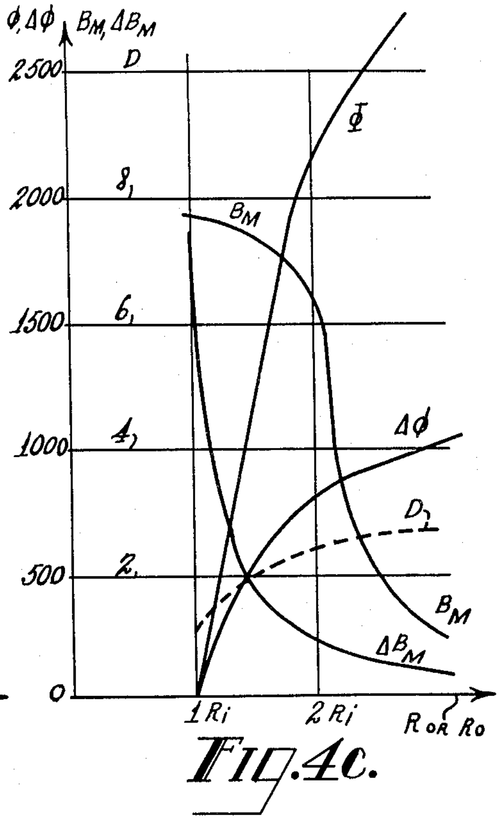

FIGURES 4*a*, 4*b*, and 4*c* are graphs of the parameters B*m*, and ΔB*m* as a function of the radius R (in units of the toroid inner radius R*i*) for various radial zones of a thicker (in the radial dimension) toroid. The FIGURES 4*a*, 4*b* and 4*c* are each taken for a different one of various values of excitation current I. The scales of H, B, and $\phi$ are arbitrary. In a toroidal core, the magnetizing force H within the core can be considered, with sufficient accuracy for the present purposes, to be symmetrical about the center of the core, even when the excitation winding does not pass through the center of the core. When this assumption is made, the ampere-turns *ni* (where *n* is the number of turns and *i* is the excitation current) linking the core is equal to a value of $2\pi RH$ where R is equal to the radial distance from the center of the core. The values of *n* and *i* are known. From these values, the magnetizing force $$H=\frac{ni}{2\pi R}$$

is calculated for various radially thicker toroids. The values of remanent magnetic induction B$m$ and the change $\Delta$B$m$ caused by a half excitation magnetizing force are obtained from the curves of FIGURE 3 for the corresponding magnetizing force H and radius R.

The flux $\phi$ then is computed by integrating (by graphical integration, for example) the magnetic induction B$m$ across a cross-sectional area of the different toroids. The curve of $\Delta\phi$ represents the change in flux due to a half excitation current which is applied to a toroid of given radius and is the integral of the $\Delta$B$m$ curve. The curve of discrimination D is the ratio between the flux $\phi$ and the change in flux $\Delta\phi$ for the thicker toroid of various radii. The flux change $\Delta\phi$ and the discrimination D are plotted as a function of the outside radius R$o$, also in limits of the inside radius R$i$.

Note that at a radial distance $Ro=2Ri$, that is, for a toroid the outside diameter O.D. of which is twice its inside diameter I.D., the magnetic induction B$m$ has reached a relatively low value (compared to the value at R$i$) and the flux $\phi$ approaches its asymptotic limiting value with increasing R, thereby indicating that the major portion of the flux $\phi$ is located with the radial distance R$o$.

Figure 5A:
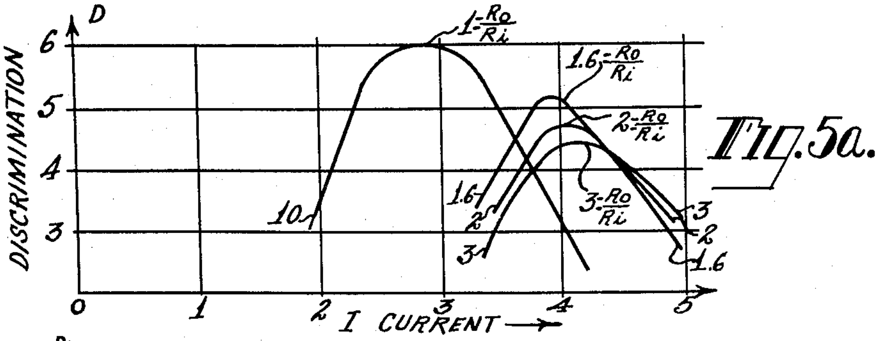
Figure 5B:
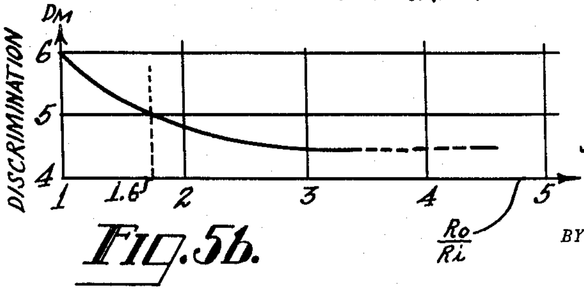

FIGURE 5$a$ is a graph of the discrimination D as a function of current excitation I for toroids of different radial thicknesses as shown by the ratio of $Ro/Ri$. The values of discrimination D, for the varying radial thickness toroids, were obtained from the curves plotted in FIGURES 4$a$–4$c$ for the various excitation currents.

FIGURE 5$b$ is a graph of the maximum discrimination D$m$ (that is, the value of the discrimination D which corresponds to the optimum switching current) as a function of the radial thickness of the toroids $Ro/Ri$. The values of the maximum discrimination D$m$ correspond to those shown in FIGURE 5$a$ for the varying thickness toroids. It is apparent from the graph shown in FIGURE 5$b$ that an appreciable loss of discrimination $D_m$ occurs, even at the value of $Ro/Ri=1.6$ which is the ratio of certain, commercially available toroids (.080" O.D. to .050" I.D.). The graph shown in FIGURE 5$b$ indicates that for toroidal thicknesses greater than $Ro/Ri=1.6$, there is very little additional loss in discrimination D. It may be concluded from the foregoing that, in the case of an apertured plate, the magnetic material surrounding an aperture in the plate still provides relatively good discrimination D. The additional magnetic material may be considered to correspond to a thickening of the magnetic core which comprises the magnetic material limiting an aperture. The theory advanced above by way of explanation thus is in good accord with the observed results. Note, however, that these results are obtained although the theory may be neither complete nor exact.

Consider now a plate of magnetic material having a regular array of apertures each located equidistant from the next adjacent one on rows and columns such as the plate 1 shown in FIGURE 1$a$.

If an excitation current is passed through an aperture, for example, by means of an excitation winding 5$a$, as shown in FIGURE 1$b$, then, the major portion of the flux resulting from this excitation current is located in a region limited by the four immediately adjacent apertures. In so far as a single aperture is concerned, it is desirable to locate the apertures 3 at a minimum center-to-center spacing C because, for any given diameter D, the equivalent magnetic core surrounding the aperture is thinnest. Consequently, the discrimination D, for the optimum excitation current, is maximized as shown by the graph plotted in FIGURE 5$b$. However, the magnetization of the magnetic material between any two adjacent apertures is dependent upon the excitation currents passing through those apertures, and therefore, interaction effects between circuits coupled to the magnetic material about adjacent apertures may be expected to increase as the center-to-center spacing C is decreased. It is, therefore, apparent that there will be an optimum spacing or a ratio $D/C$ for which the discrimination effects are relatively as low as possible.

Figures 6A, 6B:
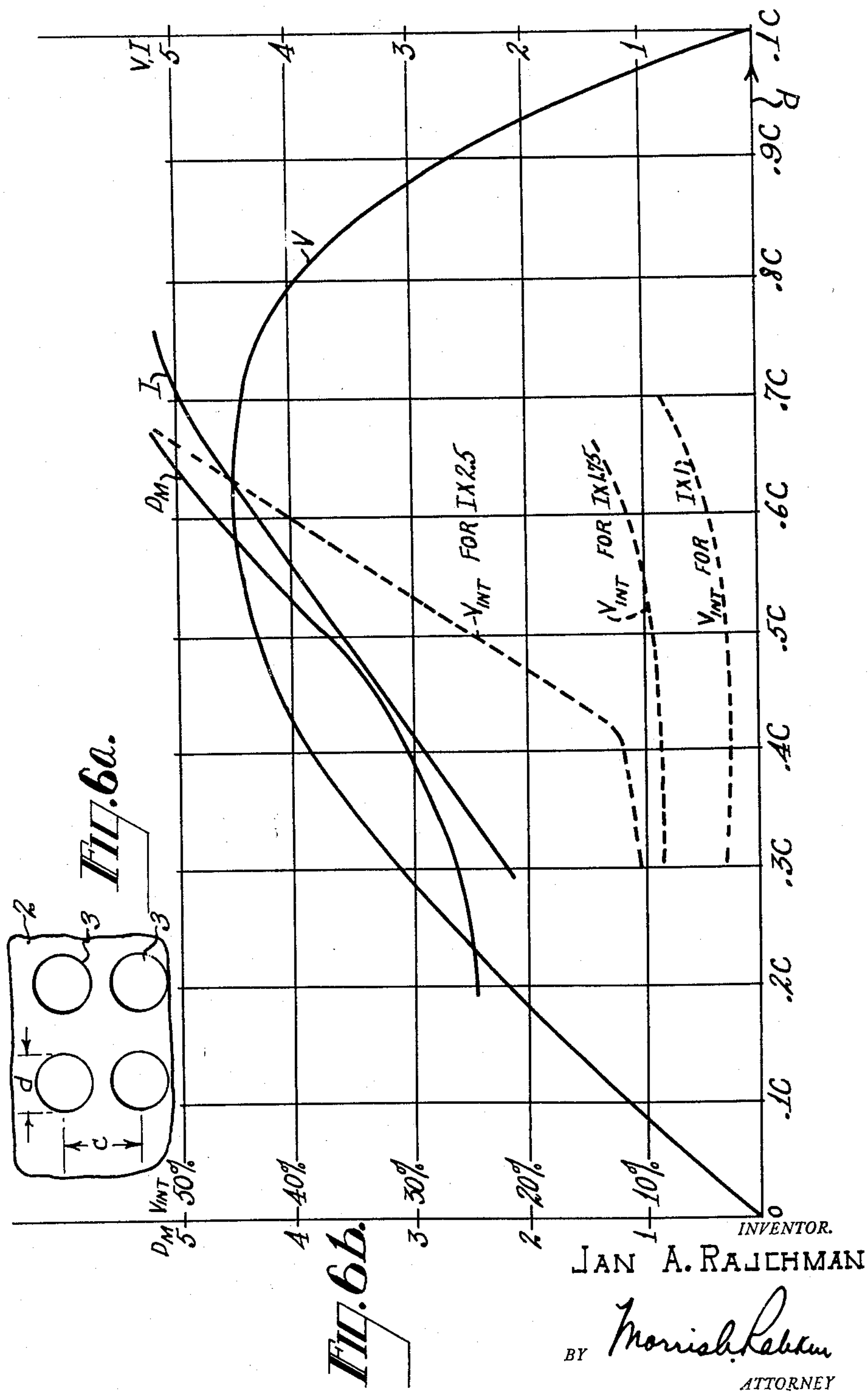

Consider, now, an apertured plate which is provided with a regular array of apertures of diameter $d$ located with a center to center spacing C, as above. FIGURE 6$a$ illustrates a segment of such a plate 2. FIGURE 6$b$ is a graph of various parameters I, D$m$, $V_{int}$, and output voltage plotted against the diameters $d$ in units of the center-to-center spacing C, which is taken as fixed, such as the plate 2 of FIGURE 6$a$. Those values of excitation current I which produce maximum discrimination D$m$ in an individual aperture (as explained in connection with FIGURE 5$a$) are plotted in one curve of FIG. 6$b$. The values of excitation current increase almost linearly with the diameter $d$ of the individual apertures as shown by the curve I of FIGURE 6$b$. The curve of the output voltage V represents the values of voltage induced in an output winding linking the magnetic material limiting a given aperture. Each value of the output voltage V is obtained by first applying an excitation current of one polarity followed by another excitation current of the opposite polarity, but same amplitude, to the excitation winding threading the given one of the apertures. The amplitude of the one polarity excitation current is chosen so that the maximum discrimination $Dm$ is obtained. Each value of output voltage V is that which is induced in the output winding by the flux change around the given aperture for the optimum value of the excitation current for the corresponding diameter. The output voltage V increases linearly in the case of relatively small diameter apertures, then passes through a maximum and decreases in the case of large diameter apertures as the diminishing amount of material between apertures diminishes the number of voltage inducing flux lines.

The values of D$m$ are obtained in a fashion similar to those obtained and plotted in FIGURE 5$b$. The curve of the discrimination D$m$ increases with the diameter $d$ of the aperture. This is equivalent to the variation of D$m$ with respect to the ratio $Ro/Ri$ of the outside diameter to the inside diameter of an imaginary toroid as was explained in connection with FIGURE 5$b$. The interaction effects of circuits coupled to the material about adjacent apertures may be measured, at least approximately, by measuring the interaction effects between the magnetic circuits about adjacent apertures. Flux is established by a current through a given aperture. The loss or change of the flux about the given aperture due to current through an adjacent aperture is taken as a measure of the interaction effects. This loss or change of flux may be measured by measuring the voltage $V_{int}$ induced in an output winding linking the given aperture when the adverse excitation current is applied through the adjacent aperture. Moreover, the current through the adjacent aperture is taken in that sense which induces the greatest change of flux in the output winding. Three different curves of $V_{int}$ are shown and respectively represent adverse excitation currents in the aperture adjacent to the given aperture of 1, 1.75, and 2.5 times greater than the excitation current originally applied to the excitation winding of the given aperture.

FIGURE 6$b$ indicates that when the value of $d/C=.5$: that the output voltage V is substantially a maximum value; the discrimination D$m$ is fairly high; and the interaction voltage $V_{int}$ is quite low. The values of V, D$m$, and $V_{int}$ are (all considered) optimum when the ratio of $d/C$ is substantially equal to a value of 0.5 as before, and the values are acceptable when the ratio of $d/C$ ranges from a value of about 0.4 to a value of about 0.6. Therefore, in accordance with the relationships shown in FIGURE 6$b$, apertured plates wherein the center-to-center spacing of the apertures is selected to be equal to twice the diameter $d$ of the individual apertures possess optimum characteristics for storage of information. There is relatively little interaction voltage between adjacent cores, and relatively good discrimination of individual cores, as well as a relatively high output voltage when the cores are so located in the plate of magnetic material.

The exact shape of the hysteresis loop of the magnetic material constituting the plate somewhat influences the optimum value of $d/C$ equal to ½. For more perfectly "rectangular" materials, a larger value of $d/C$ can be tolerated. And, because the number of apertures permissible in a plate of any given configuration is proportional to the ratio of $d/C$, it is possible to decrease the center-to-center spacing C of the apertures and thereby increase the number of information storing cores. Thus, the more "rectangular" the magnetic material, the greater the packing density for any given plate configuration.

Figure 7A:
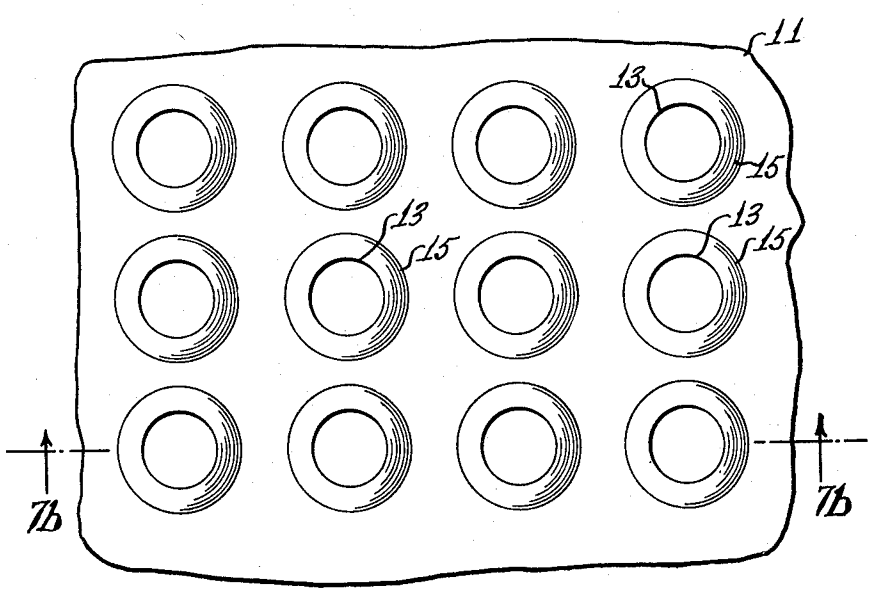

FIGURE 7*a* shows a plan view of a section of an apertured magnetic plate 11 which has a collar 15 surrounding each aperture 13. In this construction of an apertured plate, a portion of the flux surrounding each aperture is due to the collar acting as a discrete toroid and thus only the remaining portion of the flux is subject to the inter-action voltage $V_{int}$ when an excitation current is passed through the adjacent apertures. Therefore, the addition of a collar causes the set of parameters defining the characteristics of the cores to correspond more closely to the parameters of relatively thin individual toroids. By providing collars which are thin and elongated, a considerable improvement of both the discrimination D and the inter-action voltage $V_{int}$ can be obtained. As a practical matter, it is possible to make the thickness "$t$" of the individual collars 15 smaller than the thickness of the conventional toroids because the mechanical strength of the collars 15 is aided by the support afforded by the plate 11, whereas the mechanical strength of individual self-supporting toroids depends upon the thickness of the magnetic material constituting the toroid. Therefore, improved results can be obtained with the combination of a plate and thin collared apertures due to the improved discrimination D resulting from the smaller $Ro/Ri$ ratio (FIGURE 5*b*) than is obtained in the case of individual toroids.

Figure 7B:
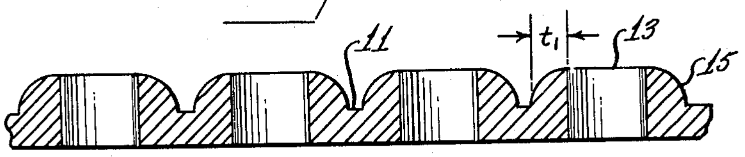

FIGURE 7*b* is a cross-sectional view of the section of the plate 11 of FIGURE 7*a* taken along the line 7*b*—7*b* and shows in more detail the arrangements of the collars 15.

Figure 7C:
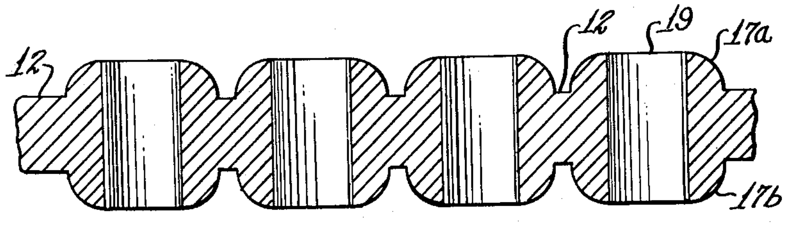

FIGURE 7*c* is a cross-sectional view of a segment 12 of an apertured magnetic plate illustrating an additional modification wherein a collar **17*a* is provided on the top portion of each of the apertures 19 and a similar collar 17*b* is provided on the bottom portion of each of the apertures 19. The effect of the double collar is to further concentrate the flux and thereby reduce the inter-action $V_{int}$ between adjacent cores around the apertures 19**. In order to facilitate the fabrication of the plates shown in FIGURES 7*a*, 7*b* and 7*c*, the collars 15, **17*a* and 17*b*** are tapered in order to allow for easy withdrawing of the die when the fabrication includes molding and die processes.

Figure 7D:
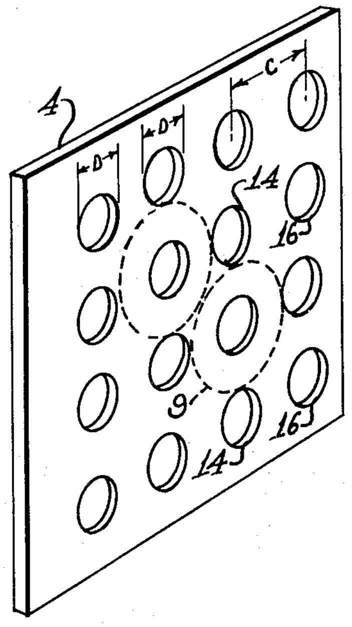

FIGURE 7*d* is a perspective view of an apertured plate illustrating another method of reducing the interaction between apertures, while at the same time maintaining high discrimination, by the use of auxiliary apertures. Typically, a geometrical array of 4 by 4 apertures is formed in the plate 4. Alternate apertures of each row and each column are auxiliary apertures 16, the remaining apertures 14 are used for storing binary digits. Each of the apertures may be of a diameter $d$ with the apertures so located that the center-to-center spacing "C" between the adjacent apertures is equal to a value of 1.5$d$. The effective storage region of a storing aperture thus includes the magnetic material limited by the four adjacent auxiliary apertures, as shown by the dotted line 9.

Figure 8:
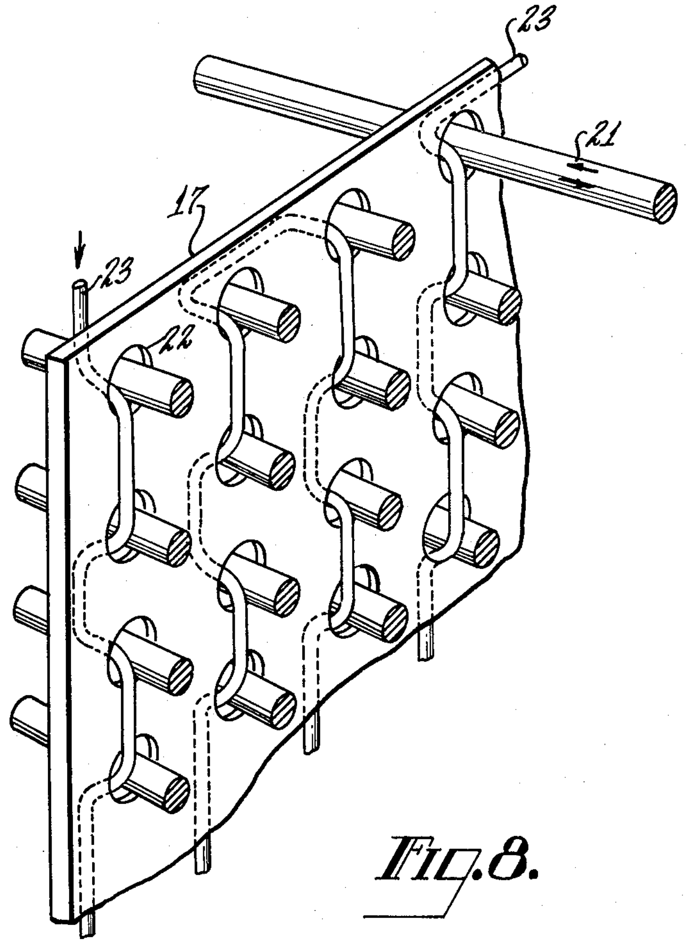
FIGURE 8 is a perspective view of an apertured magnetic plate and the arrangement of the excitation windings.

In FIGURE 8, there is shown a segment of an apertured magnetic plate which is similar to the plate 1 of FIGURE 1*a*. The segment of the plate 17 is arranged to provide a core plane of a coincident-current magnetic memory such as the one described in application Serial No. 375,470 filed August 20, 1953, by Jan A. Rajchman and Richard O. Endres entitled "Memory System," now Patent No. 2,784,391, issued March 5, 1957.

Each of the apertures 22 is of a diameter $d$. The center-to-center spacing C of adjacent apertures 22 is chosen such that the ratio $d/C$ is in the order of 1/2 thereby providing a relatively high value of discrimination D and a relatively low value of interaction voltage $V_{int}$. Each of the apertures 22 may be provided with a single collar similar to the collar 15 shown in FIGURES 7*a* and 7*b* or with a double collar similar to the collars **17*a* and 17*b*** shown in FIGURE 7*c*. If desired, every other aperture of a row and column may be an auxiliary aperture as described in connection with FIGURE 7*d*.

An individual address selecting, coil coupling 21 is threaded through each of the apertures 22. A single digit plane winding 23 links all of the cores about the apertures 22 in a checkerboard fashion as described in aforesaid Rajchman Patent No. 2,691,154.

Information in the form of a binary digit may be stored in the magnetic material limiting any given one of the apertures 22 of plate 17 by passing an excitation current through a selected one of the coil couplings 21 such that the magnetic material limiting the selected aperture 22 is excited to one or the other of its two states of remanent magnetic induction.

If one state of remanent magnetic induction is in a direction "P" corresponding to a binary one, and the other state of remanent magnetic induction is in a direction "N" corresponding to a binary zero, then, a binary digit may be stored in the magnetic material limiting a selected one of the apertures 22 by applying a suitable excitation current to the one coil coupling 21 which threads the selected aperture 22. The information stored in the magnetic material limiting an aperture 22 may be read out by applying an interrogating current of a standard polarity to the corresponding coupling 21 and observing the voltage induced in the digit plane winding 23.

For example, if a binary one is stored in the magnetic material limiting a given one of the apertures, 22, and the polarity of the interrogating current is such as to drive the magnetic material limiting the given aperture 22 in the "P" direction, relatively little voltage is induced in the digit plane winding 23.

However, a relatively large voltage is induced in the digit plane winding 23, in response to the interrogating current, when a binary zero is stored in the magnetic material limiting the given aperture 22.

Various methods for storing and reading-out information in the coincident-current magnetic memories are known. The aforementioned Patent No. 2,784,391 describes several different methods for storing and reading-out information including $x$—$y$ current coincidence, where $x$ represents an individual columnar coil coupling and $y$ represents an individual row coil coupling.

A plurality of plates such as the plate 1 of FIGURE 1*a* may be stacked in sandwich-like fashion to provide a three dimensional magnetic memory such as is described in the above "Memory System" application.

Because of the almost negligible electrical conductivity of the ferro-magnetic, spinel materials, a particularly advantageous method of forming the various windings on the plate is the printing or coating of the plate with a conductive coating which constitutes the portion of the windings on the plate.

Figure 9:
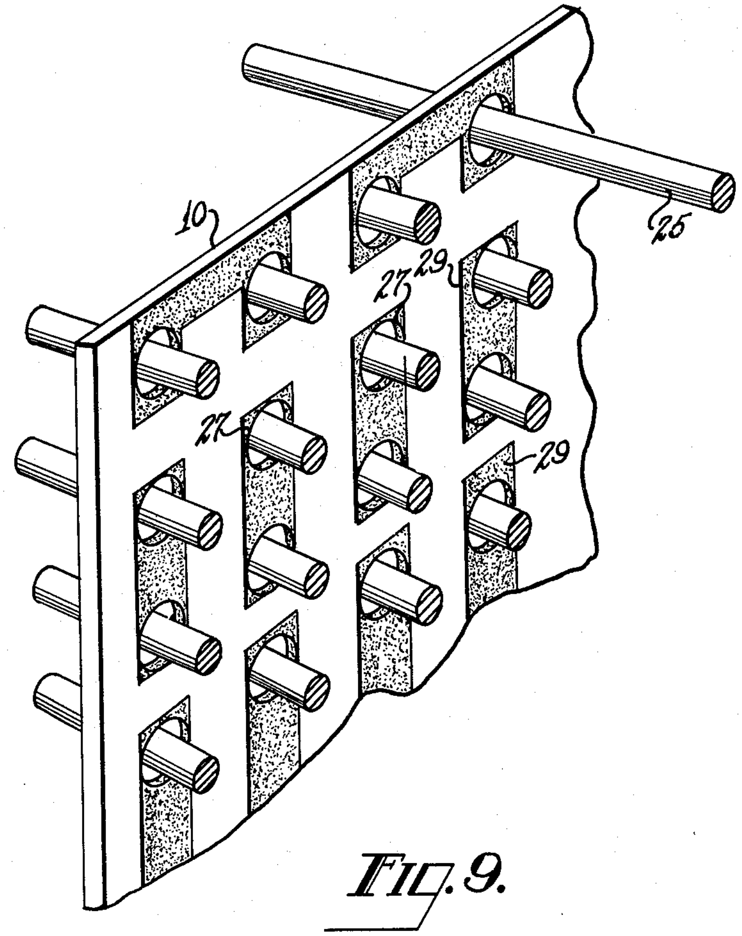
FIGURE 9 is a perspective view of a portion of an apertured magnetic plate having the portion of the digit plane winding on the plate constituted by a conductive coating.

FIGURE 9 illustrates a prespective view of a section of an apertured plate 10 which is fabricated from magnetic material of a ceramic nature. An individual address selecting, coil coupling 25 threads each core about each of the apertures 27. The coil couplings 25 consist of straight pieces of insulated wire. The portions of the digit plane winding 29, on the surfaces of the plate 10, are constituted by a conductive coating. By applying the conductive coating to the inside wall of each of the apertures 27, each of the cores about the apertures 27 is linked by the winding 29. The fabrication of a high speed, random access memory is considerably simplified by the "printed circuit" technique of forming the portion of the digit plane winding 29 on the apertured plate 10. The extremely laborious task of threading wire through a tremendous number of apertures is eliminated by the printing of the digit plane windings directly onto the apertured plate.

Various methods of applying a conductive coating to an insulating surface are well known. The conductive coating may be sprayed or evaporated through appropriate masks which cover the entire surface area with the exception of the area reserved for the digit winding 29. An alternative method of applying the conductive coating may be that of covering the entire surface of the plate with a conductive coating and removing all the coating except for the portion constituting the digit winding 29.

A particularly suitable method consists of spraying the plate with a silver coating by means of a mixture of silver nitrate in ammonium hydroxide and hydrozine sulfate. The nitrate solution and the sulfate are fed from two separate containers and directed onto the piece to be coated. When these two chemicals come in contact, a silver coating is produced essentially instantly on the piece being sprayed. There are commercially available double nozzle sprays, by which the chemical agents are mixed externally to the nozzle. The piece is sprayed completely, including the inside walls of the apertures. After the spraying step, the undesired parts of the coating are selectively blasted away. The portions of the coatings which are to be retained are protected by a suitable mask placed in intimate contact with the sprayed piece. Then a vapor blast of very fine, abrasive particles is sprayed onto the surfaces of the piece, as by presently available commercial machines. After the piece is vapor blasted, additional silver may be plated on top of the resultant winding to increase its thickness, and thereby reduce its electrical resistance.

Referring to FIG. 10*a*, an apertured, ferromagnetic plate 30, only a segment of which is shown, is provided with an array of apertures 37. The apertures 37 are arranged, for example, in horizontal rows 33 and vertical columns 35. The diameter and the center-to-center spacing C of the apertures 37 are chosen as described above. A digit plane winding 31 links the core enclosing each aperture of the array. The winding 31 is arranged in a checkerboard fashion. In the left hand column (as viewed in the drawing), the winding 31 is coated on the top surface of the plate, then on the inside wall of the bottom aperture of this column to link the bottom core, then on the bottom surface of the plate, then on the inside wall of the next aperture to link the next core of this column and so on. After linking the uppermost core of the left hand column, the winding 31 is coated on the top surface of the plate, then on the inside wall of the uppermost aperture of the second column to link its uppermost core, then on the bottom surface of the plate, then on the inside wall of the next aperture of the second column to link the next core, and so on. After linking the bottommost core of the second column, the winding 31 is coated on the bottom surface of the plate, then on the inside wall of the bottommost core of the third column to link its bottommost core, then on the top surface of the plate, then on the inside wall of the next aperture of the third column to link the next core, and so on. Each adjacent core is thus linked in series opposition by winding 31. FIGURE 10*b* is a cross-sectional view taken along the line 10*b*—10*b* of one of the columns 35 of FIG. 10*a*. The arrows indicate the direction in which a conventional excitation current flows when a source of voltage (not shown) is connected to the winding 31, with the positive terminal of the voltage source applied to the conductive coating of the uppermost aperture, and the negative terminal applied to the conductive coating of the lowermost aperture. It is apparent that an excitation current flowing in the digit plane winding 31 passes through each aperture of this column.

In FIG. 10*a*, the cores enclosing corresponding apertures 37 of alternate pairs of the rows 33 are linked in series opposition by islands of conductive coating 33*b*. The coating on the portions of the plate 33*a* between adjacent pairs of the rows 33 is removed. On the bottom surface of the plate, similar islands of conducitve coating on the portions 33*a* link the cores enclosing corresponding apertures of adjacent pairs of rows in series opposition. The conductive coating is removed on the bottom surface between those rows which are connected on the top surface.

The cores enclosing the uppermost apertures of alternate pairs of columns 35 are linked in series opposition by an island of conductive coating on the top surface of the plate 30. The cores enclosing the lowermost apertures of the remaining pairs of columns are linked in series opposition by an island of conductive coating on the bottom surface of the plate.

Accordingly, if the coating is applied by the spraying method, the blasting of the surfaces is conveniently performed in two steps because the islands of conductive coating are isolated from each other. The blasting could be performed with a single step on both surfaces but in such a process, each individual island of conductive coating would have to be separately protected.

For example, when the blasting is performed in two steps on the top surface, the first step is to blast all the conductive coating in one direction such as the coating on the portions 33*a*; the second step is to blast all the conductive coating in the other direction such as the portions 35*a*, 35*b* intermediate alternate pairs of the columns 35. The coating is similarly removed on the bottom surface on the portions 33*b* and 35*a* and 35*b*. The mask in each of the above blasting steps consists of strips separated by the lines to be removed. If a metallic mask is used, it may be sprayed with a rubber cement in order to prevent abrasion resulting from the vapor blasting.

In coincident-current magnetic memories, one-half of the wiring work is entirely eliminated when the core planes are replaced by apertured plates, with the portions of the digit plane winding on the plates being constituted by a conductive coating. The address selecting coil couplings may be easily inserted through a whole stack of perforations in the same operation because the address coil couplings consist of relatively short, stiff pieces of insulated wire.

The method of applying a conductive coating to the core planes of different types of coincident-current magnetic matrix memories may be extended to those wherein more than two windings are threaded through each core. For example, in the myriabit magnetic memory system which is described in an article by Jan A. Rajchman entitled "A Myriabit Magnetic-Core Matrix Memory" published in the October 1953 issue of "Proceedings of the I.R.E." at pp. 1407–1421, or the memory system which is described in an article entitled "Static Magnetic Matrix Memory and Switching Circuits," RCA Review, vol. XIII, pp. 183–201, June 1952, by Jan A. Rajchman, there are shown a number of methods, for storing information in a magnetic memory.

Each of the cores of the myriabit memory is provided with a row wire, a column wire and a read-out winding. A particular core is selected by applying current pulses simultaneously to a column wire and a row wire. Only the core located at the intersection of the pulsed column and row wires receives sufficient magnetizing force to cause it to reverse its remanent state of magnetic induction.

FIGURE 11 illustrates an apertured, ceramic, magnetic plate 40 which is provided with a 4 by 4 array of apertures 41 capable of storing 16 binary digits. The row wires 43 are constituted on the plate 40 by a conductive coating, and the column wires 42 are constituted on the plate 40 by a different conductive coating. Each core enclosing each aperture 41 of a column is linked in series, and each core enclosing each aperture 41 of a row is linked in series, as shown. The conductive coatings may be applied to the plate 40 by the method of spraying both sides of the plate 40 and blasting the undesired portions of the coating while protecting the desired portions with suitable masks. The conductive coating which represents the portion of the row wire on the plate is insulated from the conductive coating which represents the portion of the column wire on the plate in the inside wall of each of the apertures 41. One method of separating the row and column regions of the inside wall of each of the apertures 41 is shown in FIGURE 14*a* which is a plan view of a segment of the plate 40 including four of the apertures 41.

Each of the apertures 41 is provided with two protuberances or knobs 41*a* and 41*b* which extend from the top surface to the bottom surface of the plate. These protuberances may be provided in the initial molding step. After the surfaces of the plate have been sprayed and blasted, the tips of the protuberances are removed by a grinding operation thereby insulating the row region of the column region of the inside surface of each of the apertures 41 as shown in FIGURE 14*c* which is a more detailed view of one of the apertures 41.

Another method for applying the conductive coating to the apertured plates may be a metal evaporation technique. In the metal evaporation technique, the regions inside of the apertures may be insulated from each other without the provision of the protuberances because of the sharp shadows which can be cast by a suitable mask (or the plate itself) if the evaporation is carried out in a high vacuum.

FIGURE 12 is a plan view of a ceramic-like magnetic plate 30 which is provided with a 4 by 4 array of apertures 57. In this case the portions of the row, column, and read-out windings on the plate 50 are constituted by suitable conductive coatings. The row winding 51 links each core enclosing each of the apertures 57 of each of the rows in series, the column winding 53 links each core enclosing each of the apertures 57 of each of the columns in series, and the read-out winding 55 links each core enclosing each of the apertures 57 in series. Again, the regions on the inside of the apertures 57 which represent the row, column and read-out windings are insulated one from the other. FIGURE 14*b* illustrates one method for separating the regions. Each of the apertures 57 is provided with four protuberances 57*a*–57*d* which extend from the top surface to the bottom surface of the plate. Subsequent to the spraying and blasting of the surfaces of the plate, the tips of the protuberances are ground off thereby insulating the regions from each other.

Again the protuberances 57*a*–57*d* may be provided in the initial molding step.

FIGURES 13*a* and 13*b* illustrate another method whereby conductive coatings on an apertured plate are used to form portions of a number of different windings on the plate. A plan view of an apertured plate 60 which is provided with a 4 by 4 array of apertures 65 is shown in FIG. 10*a*. Each of the portions of the row windings 61 and each of the portions of the column windings 63 on the plate 60 are constituted by separate conductive coatings. In the first step, the plate 60 is completely sprayed with a conductive coating and then selectively vapor-blasted, for example by masking, so that all the conductive material excepting those portions representing, for example, the column windings 63 is removed. The second step consists of covering the entire plate with an insulating coating which is not affected by the abrasive action of a vapor blast such as a rubber insulating coating. The final step consists of again spraying the entire plate with a conductive coating and selectively vapor-blasting so that all the conductive material excepting those portions representing the row windings 61 is removed. The process may be repeated in order to replace as many windings as desired. If the magnetic plate is metallic, the insulating coating may be applied before any windings are applied. This method of providing one or more windings threading the aperture saves time over other previous methods.

FIGURE 13*b* shows a cross-sectional view of two of the apertures 65. The inner conductive layer 63 extends around the entire inside wall of the aperture. The second layer is the rubber insulating coating 69 which completely covers the first conductive layer 63. The second conductive layer 61 completely covers the rubber insulating coating 69.

The method illustrated in FIGURES 13*a* and 13*b* is convenient in those situations where a great many windings are formed on an apertured plate.

FIGURE 15 illustrates one method of constructing a magnetic memory 70, in accordance with the present invention. Each of the apertured memory planes 71 is comprised of a ceramic-like magnetic material and illustratively includes an 8 by 8 array of apertures 72 capable of storing 64 binary digits. The apertures 72 are so located that the ratio between the diameter *d* and the center-to-center spacing C of adjacent apertures is substantially equal to optimum value of 1/2. A group of the apertured memory planes 71 are spaced apart and positioned parallel to each other with corresponding apertures 72 substantially in register. A switch 73 is also provided. The switch 73 may be the same as that shown and described in an application of Jan A. Rajchman, Serial No. 337,902, filed February 20, 1953, entitled "Magnetic Switching Devices," now Patent No. 2,734,184, issued February 7, 1956. Briefly, the switch 73 has a plurality of magnetic cores 74 positioned in an array wherein each row of the cores is coupled to a row coil 75; and each column of cores is coupled to a separate column coil 76. The switch 73 also has a D.C. (direct current) biasing coil 77 coupled to each of the cores 74. Each of the cores 74 has an address selecting wire 78 coupled thereto.

A desired core 74 of the switch 73 may be excited by applying a current to the one row coil 75 and the one column coil 76 which intersect, and are coupled to the desired core. A continual D.C. bias supplied by a D.C. source (not shown) is applied to the biasing coil 77 and operates to maintain all the cores 74 of the switch 73 in a given state of remanent magnetic induction. The combined intensity of the excitation currents applied to the row and column coils is sufficient to overcome the D.C. bias and to supply the magnetizing force required to turn over the selected switch core and to supply additional energy for driving a load.

Each address selecting wire 78 of the switch 73 may consist of a straight insulated wire which may easily be threaded through a switch core 74 and the corresponding apertures 72 of the memory planes 71. Thus, each address selecting wire 78 links the magnetic material of a group of aligned apertures 72. The address selecting wires 78 are connected in parallel at the switch end of the system by means of a common connection 81 and at the memory end of the system by means of a common connection 83.

Each of the memory planes 71 is provided with a digit winding 79. A portion of each winding 79 is constituted on each plane 71 by a conductive coating which weaves back and forth through the apertures 72 in a checkerboard fashion. Note that the row, column and bias windings of the switch 73 are checkerboarded in like fashion. Therefore, the polarity of the magnetizing force furnished by the driven core of the switch 73 is always in the correct sense to furnish the correct polarity excitation currents to those apertures threaded by the address selecting wire 78 which is coupled to the driven core. The conductive coating constituting the digit winding 79 on each plane 71 may be applied as a fabrication step in the manner explained in connection with FIGURE 9.

Each of the apertures 72 may be provided with a single or double rim as described in connection with FIGURES 7*a* and 7*b*. Likewise, alternate apertures 72 in a memory digit plane may be auxiliary apertures as described in connection with FIGURE 7*d*.

When a switch core is driven from state "N" to state "P" of remanent induction, a voltage of one polarity is induced in its output coil 78. As soon as the excitation is removed from the row and column coils of the switch 73, the biasing coil 77 operates to drive the selected core back to its "N" state of remanent induction thereby inducing a voltage of opposite polarity in its coupled address selecting coil 78.

An interrogating current pulse which flows in the address selecting wire 78 of the selected switch core is passed through the aligned apertures 72 which are threaded thereby. Due to the common connection 83 at the memory plane end of the system, this interrogating current pulse is returned through all of the address selecting wires threading the apertures and through the common connection 81 at the switch end of the system back to the address selecting wire of the selected switch core. By thus connecting the address selecting wires, the intensity of the current pulse flowing back through the memory planes 71 is a small fraction of the intensity of the initial interrogating current pulse. A detailed explanation of such small fractional current pulses is given in the aforementioned article by Jan A. Rajchman entitled "A Myriabit Magnetic Core Matrix Memory," and such small currents do not cause serious detrimental effects.

Thus, each core, enclosing each aperture 72 of each memory plane 71 is linked by an address selecting wire 78 from the switch 73, and a portion of one of the digit plane windings 79. There is a separate digit plane winding 79 for each plane 71.

In order to write a word consisting of a number of binary digits into a given memory position, the procedure outlined in Patent No. 2,784,391 may be followed. For example, a switch core may be driven from the "N" to the "P" state of remanent induction. The voltage induced thereby in the coupled address selecting wire 78 of the selected core 74 causes a current pulse to flow therein. The current pulse excites the magnetic material limiting the apertures threaded by the output coil to their respective "P" states of remanent induction. The selected switch core is then driven to its "N" state of remanent induction such that the current pulse, which flows in the address selecting wire 78 of the selected core 74, is of insufficient intensity to return the magnetic material limiting the apertures threaded by the selected address selecting wire to their respective "N" states of remanent induction. However, additional current can be supplied to those memory planes 71 in which it is desired to store a binary one by applying an additional current pulse to its digit plane winding 79. The polarity of the additional current pulse is chosen so as to excite the magnetic material limiting the apertures of a magnetic, memory digit plane 71 in the "N" direction. The combined intensity of the "N" restoring output current pulse and the digit plane winding current pulse is sufficient to excite the magnetic material limiting the apertures, thus selected, to the "N" state of remanent induction. The magnetic material limiting all other apertures threaded by the output coil remains in the "P" state of remanent induction. The magnetic material limiting all the other apertures of a memory digit plane 71 are unaffected because the intensity of the individual "N" restoring current pulses is insufficient to excite the magnetic material to the "N" state of remanent induction.

Information may be read out of a memory position by exciting a selected core of the switch 73 to its "P" state of remanent induction and observing the voltages induced in the respective digit plane windings 79 of the individual memory planes.

If it is desired to return the magnetic material limiting each of the interrogated memory cores to its initial state of remanent induction, a suitable information restoration circuit such as that described in the aforementioned Patent No. 2,784,391 to Rajchman et al. may be employed.

Other methods which are known in the art for writing information into and reading information from a memory system may be followed.

Each of the memory planes 71 of FIGURE 15 may consist of apertured, ceramic plates having row and column windings on the planes which are constituted by conductive coatings such as those shown in FIGURE 11. An individual aperture of the memory planes thusly constructed may be selected by furnishing half intensity current pulses to the one row winding and the one column winding which intersect and are coupled to the desired core.

Other arrays of apertures different from the square arrays illustrated in the drawing may be employed. The array of apertures may be rectangular, that is, the number of apertures constituting a row is different from the number of apertures constituting a column. The apertures also may be arranged in a hexagonal fashion, or they may be arranged in a Christmas tree array or any other convenient one. It is understood that the apertures of whatever array is employed are so located that the inter-action voltage $V_{int}$ and the discrimination D are in accordance with the present inventive concept.

There have been described herein an improved magnetic storage device and an improved random access magnetic memory and means whereby the fabrication of such a memory can be greatly simplified. The present invention provides a practical means for fabricating a fast access memory of a capacity which was heretofore impractical. The technique of forming the portions of the digit plane, row, column, and read-out windings on the magnetic material by separate conductive coatings eliminates the extremely laborious and time consuming requirement for threading the respective windings through a multitude of individual apertures.

The location of the apertures at an optimum spacing where the distance between centers is approximately twice the diameter of an individual aperture maximizes the discrimination D and minimizes the interaction voltage $V_{int}$. A further improvement in discrimination D is obtained by providing single or double rims around the separate apertures, and an additional improvement in discrimination may be obtained by the use of auxiliary apertures.

While the invention has been described and illustrated in certain specific embodiments which are deemed desirable, it is understood that the present system is capable of many further embodiments within the scope of the appended claims.

What is claimed is:

1. A device comprising a magnetic body of high remanence magnetic material having two opposed surfaces and one or more apertures each from one said surface to the other, the magnetic material around each different aperture forming a separate magnetic element and an electrical conductor threading said apertures to link said magnetic elements, said conductor comprising a metallic coating on the said two surfaces and on the inner walls of said apertures.

2. A device comprising a body including high remanance magnetic material and having two opposed surfaces and one or more apertures each from one said surface to the other, the magnetic material around each different aperture forming a separate magnetic element, and an electrical conductor threading said apertures to link said magnetic elements, said conductor comprising metallic coating on the said two surfaces and on the inner walls of said apertures.

3. A device as claimed in claim 2, there being a plurality of apertures, and said conductor threading successive apertures alternately from one of said opposed surfaces to the other.

4. A device comprising a plate including high remanence magnetic material and having two opposed surfaces and apertures from one surface to the other arrayed in rows and columns, the magnetic material about each different aperture forming a separate magnetic element, row windings linking said elements, each said row winding threading the apertures of a different row and each comprising a coating; and column windings linking said elements, each said column winding threading the apertures of a different column and each comprising a coating; each row winding between successive apertures of a row being on different said surfaces, and each column winding between successive apertures being on different said surfaces, the said windings being non-intersecting.

5. A device comprising a body including high remanence magnetic material and having two opposed surfaces and at least three apertures each from one of said surfaces to the other, the magnetic material about each different aperture forming a separate magnetic element; a first winding linking a first and second of said elements comprising a coating threading a first of said apertures from said one surface to said other surface and then threading a second of said apertures from said other surface to said one surface; and a second winding linking said first and the third of said apertures comprising a coating threading said first aperture from said other to said one surface and then threading the third of said apertures from said one to said other surface, whereby said windings are electrically insulated.

6. A device comprising a body including high remanence magnetic material and having two opposed surfaces and at least three apertures each from one of said surfaces to the other, the magnetic material around each different aperture forming a separate magnetic element; a first winding linking a first and second of said elements comprising a coating threading a first of said apertures from said one surface to said other surface on said first aperture wall, then on said other surface, and then threading a second of said apertures from said other surface to said one surface on said second aperture wall; and a second winding linking said first and a third of said elements comprising a coating threading said first aperture from said other surface to said one surface on said first aperture wall in spaced relation to said first coating on said first aperture wall, then on said one surface, and then threading said third aperture from said one surface to said other surface, whereby said windings are electrically insulated from each other.

7. A device comprising a body including high remanance magnetic material and having two opposed surfaces and an aperture from one said surface to the other, the material about said aperture forming a magnetic element, and two electrical conductors each threading said aperture to link said element, said conductors each comprising a metallic coating on said two surfaces and on the inner wall of said aperture, said inner wall coating of one said conductor being spaced from that of the other said conductor, whereby said two conductors thread said aperture and are insulated from each other.

8. A device comprising a body including high remanence magnetic material and having two opposed surfaces and a plurality of apertures from one said surface to the other, the material about each different one of said apertures forming a separate magnetic element, said apertures each having an inner wall surface continuous with said opposed surfaces, and a plurality of windings each comprising coatings on said surfaces and each threading at least some of said apertures to link the said elements about these apertures, each said aperture being threaded by at least two windings, said coatings of said two windings being spaced on said inner surface of the aperture through which both pass thereby to thread said windings insulatingly through the same aperture.

9. A magnetic storage device comprising a plate of magnetic material having the characteristic of being substantially saturated at remanence, said plate having a plurality of apertures therein, the material about each different one of said apertures forming a separate magnetic element, said apertures being arranged in rows and columns, a digit plane winding threading all the apertures in said plate to link all said magnetic elements, separate row windings threading each row of said apertures, each said row winding linking all said magnetic elements of a different one of said rows, and separate column windings threading each column of said apertures, each said column winding linking all said magnetic elements of a different one of said columns, said digit plane winding and said row and column windings each being constituted by a different conductive coating on said apertured plate.

10. A magnetic device comprising a plate of substantially insulating, high remanence magnetic material, said plate having a plurality of apertures therein, each of said apertures being provided with a plurality of protuberances extending from the inside surface defining said aperture.

11. A magnetic device comprising a plate of substantially insulating, high remanence magnetic material, said plate having a plurality of apertures therein, each of said apertures being provided with two different protuberances extending from the inside surface defining said aperture.

12. A magnetic device comprising a plate of substantially insulating, high remanence magnetic material, said plate having a plurality of apertures, each of said apertures being provided with four different protuberances extending from the inside surface defining said aperture.

13. A magnetic system comprising a plurality of planes of magnetic material, said material having two states of high remanence, each plane including a plurality of apertures therein arranged in a geometrical array, a separate memory digit plane winding for each plane threading all the apertures in said plane, said memory digit plane winding being constituted by a conductive coating on each said plane, said planes having their apertures substantially in register, and means selectively to excite the magnetic material limiting certain ones of a group of aligned apertures to one of its two states of high remanence and to excite the magnetic material limiting the other ones of said group of aligned apertures to the other of its two states of high remanence.

References Cited in the file of this patent

UNITED STATES PATENTS

| | | |
|---|---|---|
| 2,353,061 | Oldenboom | July 4, 1944 |
| 2,524,939 | Stephan et al. | Oct. 10, 1950 |
| 2,671,950 | Sukacev | Mar. 16, 1954 |
| 2,676,392 | Buhrendorf | Apr. 27, 1954 |
| 2,700,150 | Wales | Jan. 18, 1955 |
| 2,716,268 | Steigerwalt | Aug. 30, 1955 |
| 2,724,103 | Ashenhurst | Nov. 15, 1955 |
| 2,732,542 | Minnick | Jan. 24, 1956 |
| 2,771,663 | Henry | Nov. 27, 1956 |
| 2,792,563 | Rajchman | May 14, 1957 |
| 2,870,433 | Simpson | Jan. 20, 1959 |

OTHER REFERENCES

"Nondestructive Sensing of Magnetic Cores," by D. A. Buck and W. I. Frank, in "Electrical Engineering" for February 1954, page 110.